US008873425B2

(12) United States Patent
Adams, III et al.

(10) Patent No.: US 8,873,425 B2
(45) Date of Patent: Oct. 28, 2014

(54) AUTOMATIC DEVICE DETECTION AND CONFIGURATION IN A NETWORK-AWARE PRINT FULFILLMENT ENGINE

(75) Inventors: Harold S. Adams, III, New Braunfels, TX (US); Harold Blankenship, San Marcos, TX (US); James H. Gibson, Jr., Austin, TX (US)

(73) Assignee: DNP IMS America Corporation, Concord, NC (US)

( * ) Notice: Subject to any disclaimer, the term of this patent is extended or adjusted under 35 U.S.C. 154(b) by 1816 days.

(21) Appl. No.: 12/074,875

(22) Filed: Mar. 6, 2008

(65) Prior Publication Data
US 2008/0259819 A1 Oct. 23, 2008

Related U.S. Application Data

(60) Provisional application No. 60/905,190, filed on Mar. 6, 2007.

(51) Int. Cl.
H04L 12/28 (2006.01)
H04L 12/24 (2006.01)
H04N 1/00 (2006.01)

(52) U.S. Cl.
CPC ........ *H04L 41/0886* (2013.01); *H04N 1/00185* (2013.01); *H04N 1/00143* (2013.01); *H04L 41/0806* (2013.01); *H04L 41/12* (2013.01); *H04N 1/00127* (2013.01); *H04L 41/22* (2013.01); *H04N 1/00132* (2013.01); *H04L 41/0893* (2013.01)
USPC ...... 370/254; 705/26.8; 705/26.81; 358/1.15; 358/1.16; 358/1.18; 358/1.9

(58) Field of Classification Search
USPC ............... 370/254; 358/1.15, 1.16, 1.17, 1.18
See application file for complete search history.

(56) References Cited

U.S. PATENT DOCUMENTS

| 5,185,860 | A | 2/1993 | Wu |
| 6,369,909 | B1 | 4/2002 | Shima |
| 6,496,859 | B2 | 12/2002 | Roy et al. |
| 6,636,499 | B1 | 10/2003 | Dowling |
| 6,789,111 | B1 | 9/2004 | Brockway et al. |
| 7,034,958 | B1 * | 4/2006 | Hara ............... 358/1.9 |
| 2001/0021311 | A1 * | 9/2001 | Mizumo ............ 396/429 |
| 2003/0097425 | A1 | 5/2003 | Chen |
| 2003/0103235 | A1 * | 6/2003 | Gomi ............ 358/1.15 |
| 2007/0131776 | A1 * | 6/2007 | Oyama ............ 235/475 |

OTHER PUBLICATIONS

PCT/US2008/002949 International Search Report and Written Opinion, Aug. 29, 2008.

* cited by examiner

*Primary Examiner* — Asad Nawaz
*Assistant Examiner* — Najeebuddin Ansari
(74) *Attorney, Agent, or Firm* — Matthew J. Booth & Associates PLLC; Matthew J. Booth

(57) ABSTRACT

Disclosed is a system and method for automatically detecting the topology of output devices present in a network, and for automatically configuring those output devices for outputting a specific media type. One or more network devices are present in a computer network environment configured for processing orders for physical and/or electronic photographic prints. Such network devices may have one or more output devices attached thereto for fulfilling consumer orders for photographic prints. In accordance with a particularly preferred embodiment of the invention, the system and method described herein query the network devices to determine the numbers and characteristics of output devices that are attached to and active on each network device, update a listing of such available output devices on an administrative management unit attached to the network, and configure each such output device for outputting specific media types.

4 Claims, 3 Drawing Sheets

AUTOMATIC DEVICE DETECTION AND CONFIGURATION IN A NETWORK-AWARE PRINT FULFILLMENT ENGINE

CROSS REFERENCE TO RELATED APPLICATION

This application claims benefit of co-owned U.S. Provisional Patent Application Ser. No. 60/905,190 entitled "Automatic Device Detection and Configuration in a Network-Aware Print Fulfillment Engine", filed with the U.S. Patent and Trademark Office on Mar. 6, 2007 by the inventors herein, the specification of which is incorporated herein by reference.

BACKGROUND OF THE INVENTION

1. Field of the Invention

This invention relates to computer networks, and more particularly to computer networks managing the processing of images by multiple computers having multiple output devices, and even more particularly to the automatic detection and self-configuration of output devices in an image processing computer network.

2. Background of the Prior Art

Computer networks, in the form of computer hardware and software, are often deployed to allow the sharing of information and resources among disparate locations. Unfortunately, however, the creation, maintenance, and expansion of such computer networks can be a difficult task to manage, particularly if skilled computer network technicians are not available to manage such tasks. For instance, in a retail setting where computer networks are deployed, such as a computer network for managing photo processing, it is common to have multiple networked computers, each of which may optionally have photo processing software applications installed and/or physical photo output devices attached. One such commercially available photo processing software application is known as PRINT TURBINE, and is commercially available from DNP Photo Imaging America. Such photo processing software application may focus on providing the ability to receive previously composed photo orders and fulfill those orders as requested. Such photo processing software application may also be provided as separate software elements that may reside on a single or multiple computers in a particular network. Those separate software elements may include (i) a data repository component that contains information necessary to receive, store, process, and fulfill orders to a set of supported output devices, and that contains information about the physical photo output devices present in a particular deployment; (ii) a software module for programmatically submitting photo orders and for programmatically administering or managing previously submitted orders; (iii) graphical user interface applications that provide administrative and order management capabilities, and (iv) a fulfillment system (i.e., a "print engine") that supports a specific list of output devices used to satisfy orders and contains knowledge of how to communicate with each supported output device.

Such photo processing software applications are intended to be flexible and scalable to provide the broadest possible support for unique customer requirements. At one extreme, each of the aforementioned software elements could be located on different computers. At the other extreme, all major components could reside on the same computer. By way of example, software elements (i)-(iii) itemized above may reside on a primary computer in the photo processing network, while component (iv) may reside on one or more additional computers in the photo processing network.

A typical photo processing network environment thus preferably includes at least one instance of each of the aforementioned software elements installed on a computer in the photo processing network. Optionally, multiple instances of any such software element may be installed on different computers in the photo processing network. Each computer in the photo processing network that has physical photo output devices (e.g., printers) attached thereto has at least the print engine software element installed thereon. Computers in the photo processing network without attached output devices (e.g., computers dedicated to composing and submitting photo orders) may optionally have none of the aforementioned software elements installed thereon. An exemplary depiction of a photo processing network is shown in FIG. 1.

In such a photo processing network, it is desirable that each computer be able to take full advantage of the various photo output devices across the entire network. With regard to the exemplary network deployment shown schematically in FIG. 1, a retail consumer or lab operator using any of the computers in the photo processing network should be able to order any photo product capable of being produced by the supported, configured photo output devices on the network, such as (by way of non-limiting example) thermal photo printers, poster printers, CD/RW drives, etc. However, the process of correctly configuring the photo processing software application can be complex, particularly as the number of computers with attached photo output devices grows within a deployed network. Thus, it would be desirable to provide a method and system by which network resources, such as photo output devices, across an entire network could be dynamically and automatically discovered and self-configured to allow their use without requiring intervention by a network technician.

SUMMARY OF THE INVENTION

Disclosed is a system and method for automatically detecting the topology of output devices present in a network, and for automatically configuring those output devices for outputting a specific media type. One or more network devices are present in a computer network environment configured for processing orders for physical, and/or electronic photographic prints. Such network devices may have one or more output devices attached thereto for fulfilling consumer orders for photographic prints. In accordance with a particularly preferred embodiment of the invention, the system and method described herein query the network devices to determine the numbers and characteristics of output devices that are attached to and active on each network device, update a listing of such available output devices on an administrative management unit attached to the network, and configure each such output device for outputting specific media types.

With regard to one aspect of a particularly preferred embodiment of the invention, a method of detecting and configuring one or more output devices on a network is provided, such method comprising: (i) prompting a first network device attached to the network to count a first number of output devices attached to the first network device so as to create a first output device count, the first number of output devices having a first available media output profile; (ii) transmitting the first output device count to a data repository attached to the network; (iii) prompting a second network device attached to the network to count a second number of output devices attached to the second network device so as to create a second output device count, the second number of output devices having a second available media output profile; (iv) transmitting the second output device count to the data repository; (v) combining the first and second output device counts to create a network output device count and storing the network output device count in the data repository; and (vi) creating a network media output profile by combining the first and second available media output profiles.

With regard to another aspect of a particularly preferred embodiment of the invention, a system for detecting and configuring one or more output devices on a network is provided, comprising: (i) a first network device attached to the network and at least one first output device attached to the first network device, the first network device having computer executable code configured to count a first number of output devices attached to the first network device so as to create a first output device count, and the first number of output devices having a first available media output profile; (ii) a second network device attached to the network and at least one second output device attached to the second network device, the second network device having computer executable code configured to count a second number of output devices attached to the second network device so as to create a second output device count, and the second number of output devices having a second available media output profile; (iii) a data repository attached to the network and configured to receive the first output device count from the first network device and the second output device count from the second network device; and (iv) a management unit attached to the network having computer executable code configured to combine the first and second output device counts to create a network output device count and to store the network output device count in the data repository, and to create a network media output profile by combining the first and second available media output profiles.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF EXEMPLARY EMBODIMENTS

The invention summarized above and defined by the enumerated claims may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The system and method set forth herein will quickly allow setup of a photo product fulfillment network via dynamic automatic detection and self-configuration of local print-capable and media-producing output devices. Through such dynamic, automatic discovery, the effort required to configure a photo processing software network can be reduced, and the risk of human error during network configuration can be minimized.

Figure 1:
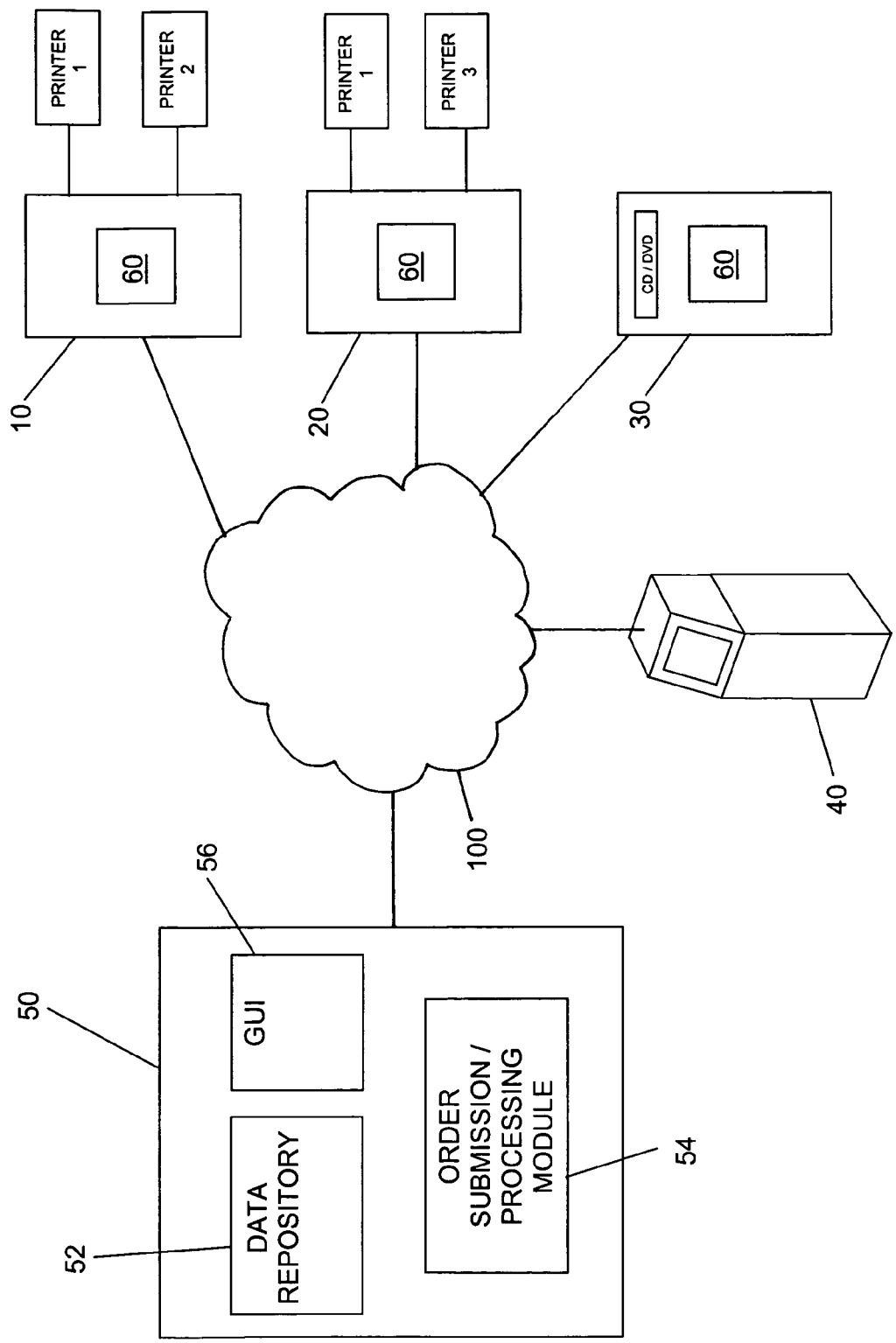
FIG. 1 is a schematic view of a computer network for processing orders for photographic prints suitable for implementation of an exemplary embodiment of the invention.

FIG. 1 is a schematic view of an exemplary network configuration employing automatic device detection and self-configuration in accordance with a first particularly preferred embodiment of the invention. As shown in FIG. 1, various network devices 10, 20, and 30 are provided in communication with network 100, such as a local area network ("LAN"). Network devices 10, 20, and 30 may comprise, for instance, personal computers, servers, or other devices capable of managing a print function in response to a print order that is processed by management unit 50, as described in greater detail below. A user terminal 40 may be provided to allow a customer user to engage photo processing software on the system to receive, process, and fulfill the customer's order.

In order to ultimately fulfill a customer's order, one or more output devices must be provided to generate the desired output, such as (by way of non-limiting example) a collection of 5×7 photographic prints, a CD of electronic images, or the like. Thus, one or more of network devices 10, 20, and 30 may be provided one or more output devices. For instance, as shown in the exemplary network configuration of FIG. 1, each of network devices 10 and 20 may have multiple output devices attached, such as a plurality of photographic printers, while network device 30 may have a CD burner attached thereto for producing CDs with the customer's photo order. It will be understood by those of ordinary skill in the art that the number and type of output devices attached to each network device, and the number of network devices, per se, may be adapted to suit the preference of the individual installation without departing from the spirit and scope of the instant invention.

As shown in FIG. 1, an exemplary software system operative with the automatic device detection system and method described herein preferably includes at least a data repository 52, a photo order administration module 54, a graphical user interface module 56, and a print engine module 60 that is operable on each network device to which an output device is installed. Data repository 52, photo order administration module 54, and graphical user interface module 56 may be co-located on a single computer such as management unit 50 in communication (via network 100) with user terminal 40 and network devices 10, 20, and 30, or may alternately be located on separate elements attached to network 100, including user terminal 40 and any of the network devices. Data repository 52 preferably contains a predefined listing of photo output devices that are supported by the photo processing system, the information necessary to receive, store, process, and fulfill orders to that predefined set of supported output devices, and information about the physical photo output devices that happen to be present in the particular network topology. Those of ordinary skill in the art will recognize that various commercial products are readily available which embody data repositories, photo order fulfillment, and graphical user interfaces, such that additional details regarding these elements will not be presented further here.

Each network device in the photo processing network that has the print engine module 60 installed thereon dynamically detects all supported output devices that are attached to the network. Such detection and configuration of supported output devices may be performed automatically at system startup, on demand at the request of an operator, or at defined time intervals. The selection of when to perform such detection and configuration may preferably be performed by an administrative user of the system engaging photo order administration module 54 on management unit 50, with such instruction being communicated (via network 100) to each network device, and to each print engine module 60 installed thereon, to implement the detection and configuration method described in greater detail below.

As explained above, data repository 52 contains information necessary to receive, store, process, and fulfill orders to a set of supported output devices, along with information about the physical output devices present in the network. Each network device in the photo processing network that has print engine module 60 installed thereon automatically transmits to such data repository (pursuant to the method described in greater detail below) preferably at least: (i) output device specific information (including at least an identification of each particular output device attached to each such network device); (ii) output device to network device name mapping; and (iii) existence of Device Groups from like photo output devices connected to the same computer. Device Groups as used herein refer to logical groupings of like photo output devices, all of which are connected to a single network device on a photo processing network. Photo product fulfillment can be distributed across devices in the same device group, effectively increasing order processing speed and system throughput. Such output devices may include (by way of non-limiting example) at least the following:

- Devices that may be discovered through a USB connection to a computer in the photo processing network, including DS-40, DS-80, Q4, M4, Copal, and Shinko printers.
- Devices that may be discovered by the presence of a particular computer file, such as: Kodak DLS (the presence of which is detected where the file C:/Pixel Magic Imaging/PrintMaster/PrintEngine/KDLS.xml is present), which is a software product that provides a lab operator front end control and use of digital photo mini-lab hardware such as the Noritsu 3011; LifePics FTP (the presence of which is detected where the file C:/Pixel Magic Imaging/PrintMaster/PrintEngine/LifePicsFTP.xml is present), which receives at an FTP site order and image information, from which the orders are fulfilled by a third party overnight fulfillment service; and generic output devices (the presence of which are detected where the file C:/Pixel Magic Imaging/PrintMaster/PrintEngine/generic_folder.xml is present).
- Poster printers that may be discovered by the presence of an Onyx Poster Shop 6.0 (or similar program) installation or through a USB connection as described above.
- CD and DVD burning devices.

Output devices other than those enumerated above may likewise be utilized, and more than one method of detection may be used for at least some of those output devices.

Figure 2:
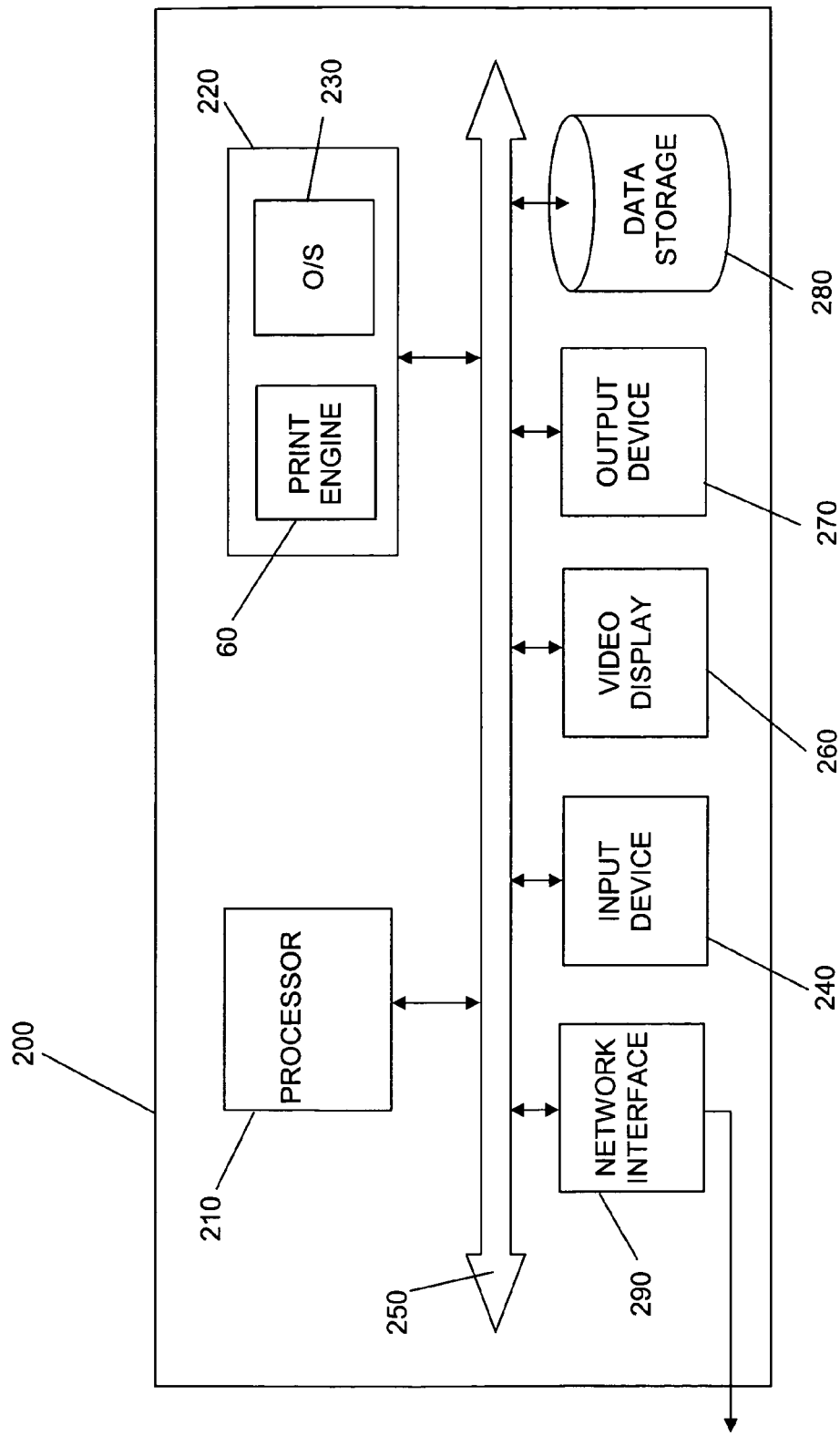
FIG. 2 is a schematic view of an exemplary network device for use in the computer network of FIG. 1.

FIG. 2 provides a schematic view of an exemplary network device, shown generally at 200. Network device 200 includes a processor 210 that communicates with other components in the network device via system bus 250. A memory 220 stores print engine module 60, in addition to an operating system 230 and any other elements desired to provide additional functions to network device 200. An input device 240, such as a keyboard, touch screen, or the like, may be used to input information from a user, and a display 260 may be provided to display information to such user. One or more output devices 270 may be provided, in addition to a data storage 280 to store the print engine module 60 and other data. A network interface 290 allows communication between network device 200 and network 100, and thus among the various network devices and management unit 50 connected to network 100, to communicate the above-described information regarding attached output devices to the rest of the network. One of ordinary skill in the art will recognize that the arrangement of such elements are of generally routine configuration and may be modified or added to in order to address particular processing needs of a given application without departing from the spirit and scope of the invention.

In order to automatically discover the presence of all such output devices 270 in the photo processing network, each network device 200 is queried to detect the presence and status of output devices 270 connected to each network device 200, and configures the system for each such output device 270. By way of example, such configuration may include designating particular photo products, and more particularly photo products of predesignated sizes (such as 5×7, 8×10, poster, etc.), available at each such output device 270, thus representing the suite of photo processing products intended to be offered by a particular installation. An exemplary algorithm for accomplishing such automatic device detection and configuration is provided below:

```
Function DiscoverDevices
    For each DeviceGroup in KnownDeviceGroups
        AvailableDevices = DeviceGroup.CountAvailableDevices
        If AvailableDevices > 0
            For each New Device In DeviceGroup
                Add Device to Database
                Device.ConfigureForOutput
            End For
                                                    // remove the existing Device Group
            DeviceGroup.RecreateDeviceGroup          // information and replace it with
                                                    // updated information from this
                                                    // function
        End If
    End For
End Function
Function Device.ConfigureForOutput
    For Each PrintOutputSize in Device.OutputSizes
        If Device.MediaSupportsOutputSize
            Device.ConfigureForOutputSize
        End If
    End For
End Function
Note: The function Device.MediaSupportsOutputSize is dependent on the device in question
and does not bear direct relevance to this auto discovery / auto configuration algorithm
```

```
except to know that Device.MediaSupportsOutputSize returns true if the media physically
in the device supports the provided output size and false otherwise.
Function DeviceGroup.CountAvailableDevices
    DeviceCount = 0
    For Each Device In DeviceGroup
        IfDevice.IsOnline
            DeviceCount = DeviceCount + 1
        End If
    End For
    Return DeviceCount
End Function
Note: The function Device.IsOnline is dependent on the device in question and does not
bear direct relevance to the algorithm except to know that Device.IsOnline returns true
if the device is available on the system and false otherwise.
```

Figure 3:
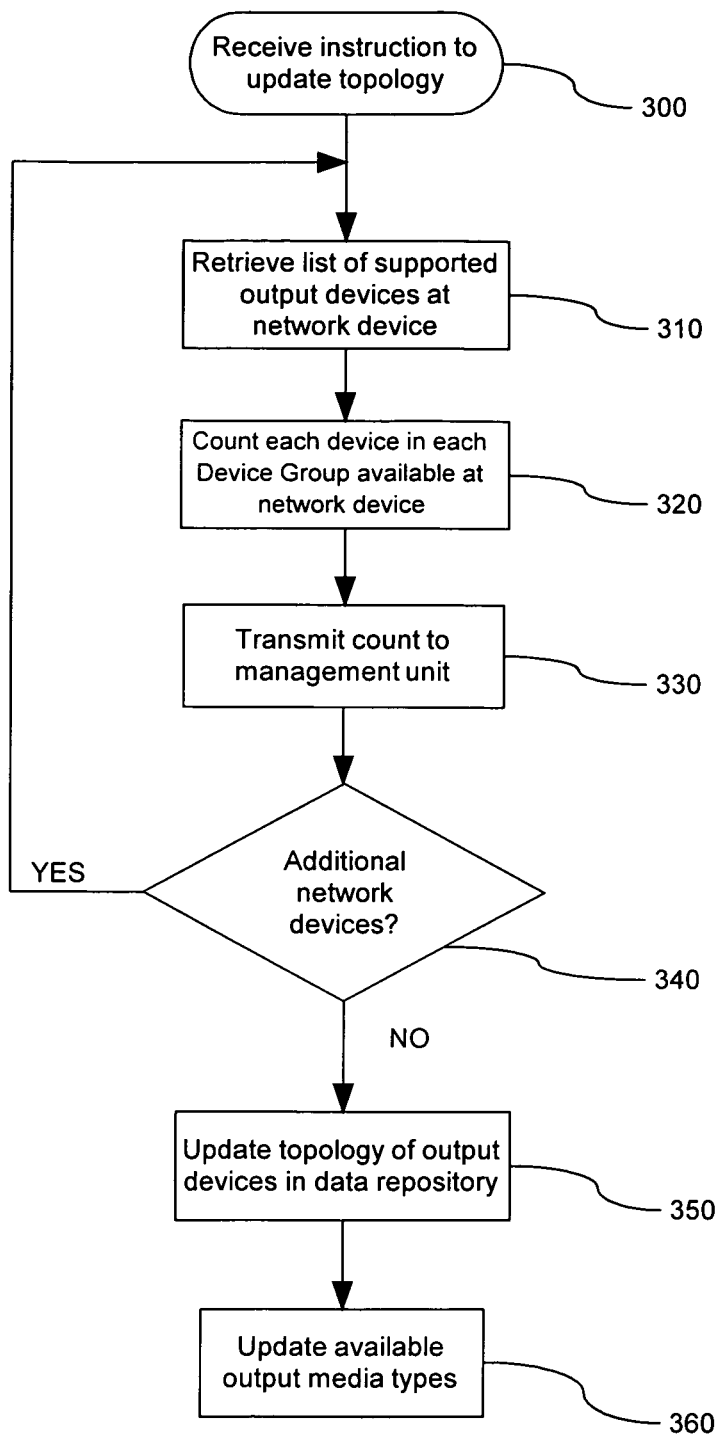
FIG. 3 is a flowchart showing a method for detecting and configuring output devices in a network according to certain aspects of a particularly preferred embodiment of the invention.

As shown in the schematic view of FIG. 3 and exemplified above, such auto-detection and self configuration method comprises a number of steps by which information identifying each output device 270 attached to network 100 through a network device 200 is communicated to data repository 52 to update the network topology with the current profile of output devices available for fulfilling orders submitted to the photo order processing system. At step 300, a network device, and more particularly print engine module 60, receives an instruction to initiate an update of the output device topology. As mentioned above, such instruction may be initiated upon startup of the system, upon the instruction of an administrative user, or at predetermined time intervals. Once the update process is initiated, at step 310 the network device optionally receives a list of supported output devices from management unit 50 (and particularly data repository 52). Optionally, such list may likewise be stored in data storage 280 on each network device 200, such that each update would not require the repeated transmission of the list of supported output devices, and may instead be updated only when a change is made to the listing stored in data repository 52 on management unit 50. At step 320, the network device 200 counts each output device in each Device Group available at that network device. At step 330, the output device count generated at step 320 is transmitted to data repository 52 on management unit 50. After such updated count has been transmitted to data repository 52, at step 340 the system determines whether there are additional network devices to query and for which output device counts are to be updated. If yes, steps 310 through 330 are repeated until each such network device 200 has been queried. If all network devices have been queried, then at step 350, the previously generated output device topology stored in data repository 52 on management unit 50 may be replaced with the updated output device topology, which comprises the total number of output devices determined in steps 310-330 for each network device 200. Optionally, if no change has been made to the most recent version of the output device topology stored in data repository 52, the prior version may be maintained.

Optionally, for network installations having multiple network devices, steps 310 through 330 may be carried out simultaneously among the network devices.

Once the output device topology has been so updated, or optionally simultaneously with the output device topology being updated, at step 360 the available output media types is also updated in data repository 52 on management unit 50. More specifically, a listing of print media output sizes is maintained reflecting the various sizes of prints that may be produced by the various supported output devices 270. That list may be presented to a user as an order option, thus allowing the user to customize their order with prints of desired sizes, CDs of images, and the like. For each new output device 270 that is found on the network, that output device is configured for outputting a specific media type, preferably based on the size of the particular media type or types that the physical output devices may support, such as 5×7 photographic prints, poster prints, images on CD, or the like. Specifically, the newly discovered output device's supported media sizes may be compared to the listing of print media output sizes available for fulfilling orders (and thus that are supported by the output devices that in turn are supported by the photo processing software), and for all matching instances of device supported media size and print output size, that new device is recognized as an available output device for orders selecting any of those output sizes.

Thus, it may be seen that the photo processing software may automatically detect the presence of and likewise configure output devices connected to computers across the entire network, thus allowing the sharing of such output devices across the entire network, without requiring intervention from a network technician to manually configure such devices. Further, by performing such method either on demand or at regularly scheduled intervals, newly added devices across the network will likewise be automatically detected and configured for use without requiring further intervention.

Having now fully set forth the preferred embodiments and certain modifications of the system and method concepts underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

The invention claimed is:

1. An automatic detection and configuration system for a photo product fulfillment LAN (local area network) system that automatically detects and configures local photo output devices connected to the LAN system, comprising:
   a local management unit that attaches to a product fulfillment LAN system, said local management unit further comprises a user interface, a local data repository, and an order submission and processing module;
   a local user terminal that attaches to said product fulfillment LAN system, said local user terminal allows the end user customer to receive, process, and fulfill the end customer's order;
   one or more local network devices attached to said product fulfillment LAN system, said local network device further comprises a local print engine module, local data storage, and one or more local photo output devices, said local print engine module either on its own or upon request by said local management unit creates a local output device count by counting the number of said local photo output devices attached to said local network device, said local print engine module additionally creates a local available media output profile, said local device output device count and said local available media output profile are stored in said local data storage;

wherein said local management unit periodically requests said local network devices to count the number of attached said local photo output devices to create a local network output device count and create a local network media output profile by combining said local available media output profiles, said local network output device count and said local network media output profile are stored in said local data repository of said local management unit, said local management unit dynamically provides said local network output device count and said local network media output profile to said local user terminal;

wherein the local photo output devices are configured for outputting a specific media type based on the size of the particular media type or types that the local photo output devices support;

wherein the media type comprises photographic prints of a selected size, poster prints, or images on a CD;

wherein a listing of print media output sizes is maintained by the local management unit reflecting supported media sizes of prints that may be produced by the local photo output devices; and wherein the end user customer is presented the listing of print media output sizes as an order option and is able to fulfill the order by selecting an appropriate and available said local photo output device through said local user terminal.

2. A method to manufacture an automatic detection and configuration system for a photo product fulfillment LAN (local area network) system that automatically detects and configures local photo output devices connected to the LAN system, comprising:

providing a local management unit that attaches to a product fulfillment LAN system, said local management unit further comprises a user interface, a local data repository, and an order submission and processing module;

providing a local user terminal that attaches to said product fulfillment LAN system, said local user terminal allows the end user customer to receive, process, and fulfill the end customer's order;

providing one or more local network devices attached to said product fulfillment LAN system, said local network device further comprises a print engine module, local data storage, and one or more local photo output devices, said print engine module either on its own or upon request by said local management unit creates a local output device count by counting the number of said local photo output devices attached to said local network device, said local print engine module additionally creates a local available media output profile, said local device output device count and said local available media output profile are stored in said local data storage;

wherein said local management unit periodically requests said local network devices to count the number of attached said local photo output devices to create a local network output device count and create a local network media output profile by combining said local available media output profiles, said local network output device count and said local network media output profile are stored in said local data repository, said local management unit dynamically provides said local network output device count and said local network media output profile to said local user terminal;

wherein the local photo output devices are configured for outputting a specific media type based on the size of the particular media type or types that the local photo output devices support;

wherein the media type comprises photographic prints of a selected size, poster prints, or images on a CD;

wherein a listing of print media output sizes is maintained by the local management unit reflecting supported media sizes of prints that may be produced by the local photo output devices; and wherein the end user customer is presented the listing of print media output sizes as an order option and is able to fulfill the order by selecting an appropriate and available said local output device through said local user terminal.

3. A method to use an automatic detection and configuration system for a photo product fulfillment LAN (local area network) system that automatically detects and configures local photo output devices connected to the LAN system, comprising:

providing a local management unit that attaches to a product fulfillment LAN system, said local management unit further comprises a user interface, a local data repository, and an order submission and processing module;

allowing the end user customer to receive, process, and fulfill the end customer's order through a local user terminal that attaches to said product fulfillment LAN system;

providing one or more local network devices attached to said product fulfillment LAN system, said local network device further comprises a local print engine module, local data storage, and one or more local photo output devices, said local print engine module either on its own or upon request by said local management unit creates a local output device count by counting the number of said local photo output devices attached to said local network device, said local print engine module additionally creates a local available media output profile, said local device output device count and said local available media output profile are stored in said local data storage;

wherein said local management unit periodically requests said local network devices to count the number of attached said local photo output devices to create a local network output device count and create a local network media output profile by combining said local available media output profiles, said local network output device count and said local network media output profile are stored in said local data repository, said local management unit dynamically provides said local network output device count and said local network media output profile to said local user terminal;

wherein the local photo output devices are configured for outputting a specific media type based on the size of the particular media type or types that the local photo output devices support;

wherein the media type comprises photographic prints of a selected size, poster prints, or images on a CD;

wherein a listing of print media output sizes is maintained by the local management unit reflecting supported media sizes of prints that may be produced by the local photo output devices; and wherein the end user customer is presented the listing of print media output sizes as an order option and is able to fulfill the order by selecting an appropriate and available said local output device through said local user terminal.

4. A non-transitory program storage device readable by a computing device that tangibly embodies a program of instructions executable by the computing device to perform a method to use an automatic detection and configuration system for a photo product fulfillment LAN (local area network) system that automatically detects and configures local photo output devices connected to the LAN system, comprising:

providing a local management unit that attaches to a product fulfillment LAN system, said local management unit further comprises a user interface, a local data repository, and an order submission and processing module;

allowing the end user customer to receive, process, and fulfill the end customer's order through a local user terminal that attaches to said product fulfillment LAN system;

providing one or more local network devices attached to said product fulfillment LAN system, said local network device further comprises a local print engine module, local data storage, and one or more local photo output devices, said local print engine module either on its own or upon request by said local management unit creates a local output device count by counting the number of said local photo output devices attached to said local network device, said local print engine module additionally creates a local available media output profile, said local device output device count and said local available media output profile are stored in said local data storage;

wherein said local management unit periodically requests said local network devices to count the number of attached said local photo output devices to create a local network output device count and create a local network media output profile by combining said local available media output profiles, said local network output device count and said local network media output profile are stored in said local data repository, said local management unit dynamically provides said local network output device count and said local network media output profile to said local user terminal;

wherein the local photo output devices are configured for outputting a specific media type based on the size of the particular media type or types that the local photo output devices support;

wherein the media type comprises photographic prints of a selected size, poster prints, or images on a CD;

wherein a listing of print media output sizes is maintained by the local management unit reflecting supported media sizes of prints that may be produced by the local photo output devices; and wherein the end user customer is presented the listing of print media output sizes as an order option and is able to fulfill the order by selecting an appropriate and available said local output device through said local user terminal.

* * * * *

UNITED STATES PATENT AND TRADEMARK OFFICE
CERTIFICATE OF CORRECTION

| | | |
|---|---|---|
| PATENT NO. | : 8,873,425 B2 | Page 1 of 1 |
| APPLICATION NO. | : 12/074875 | |
| DATED | : October 28, 2014 | |
| INVENTOR(S) | : Adams, III et al. | |

It is certified that error appears in the above-identified patent and that said Letters Patent is hereby corrected as shown below:

In the specification

In column 7, line 7, delete "IfDevice" and insert -- If Device --, therefor.

Signed and Sealed this
Seventeenth Day of March, 2015

Michelle K. Lee
*Director of the United States Patent and Trademark Office*